United States Patent
Sawai

[11] Patent Number: 6,144,531
[45] Date of Patent: Nov. 7, 2000

[54] MAGNETIC HEAD ASSEMBLY HAVING A SUSPENSION WITH A LOADING PROJECTION AND MANUFACTURING METHOD THEREOF

[75] Inventor: Kanji Sawai, Niigata-ken, Japan

[73] Assignee: Alps Electric Co., Ltd., Tokyo, Japan

[21] Appl. No.: 09/090,677

[22] Filed: Jun. 4, 1998

[30] Foreign Application Priority Data

Jun. 6, 1997 [JP] Japan .................................. 9-149064

[51] Int. Cl.$^7$ ........................................................ G11B 5/48
[52] U.S. Cl. ........................................................ 360/245.1
[58] Field of Search ................................. 360/104, 245.1

[56] References Cited

U.S. PATENT DOCUMENTS

| | | |
|---|---|---|
| 4,167,765 | 9/1979 | Watrous .................................. 360/104 |
| 4,399,476 | 8/1983 | King ........................................ 360/104 |
| 4,449,155 | 5/1984 | Meier et al. ............................ 360/104 |
| 5,079,660 | 1/1992 | Yumura et al. ......................... 360/104 |
| 5,557,489 | 9/1996 | Nakashima et al. ................... 360/104 |
| 5,636,089 | 6/1997 | Jurgenson et al. ..................... 360/104 |
| 5,638,234 | 6/1997 | Hagen ..................................... 360/104 |
| 5,781,379 | 7/1998 | Erpelding et al. ..................... 360/104 |
| 5,880,908 | 3/1999 | Shiraishi et al. ....................... 360/104 |
| 5,901,019 | 5/1999 | Bucska et al. .......................... 360/104 |
| 5,946,165 | 8/1999 | Khan et al. ............................. 360/104 |

*Primary Examiner*—Brian E. Miller
*Attorney, Agent, or Firm*—Brinks Hofer Gilson & Lione

[57] ABSTRACT

A pivot, formed by forming a slot in a load beam, protrudes obliquely and downward from the slot. A bottommost point of the pivot can be seen in the slot. The bottommost point of the pivot and a predetermined location of the head body are brought directly in line with each other by looking at the pivot in the slot, thereby reducing the amount by which they are out of line, and thus stabilizing the floating posture of the head body.

6 Claims, 7 Drawing Sheets

MAGNETIC HEAD ASSEMBLY HAVING A SUSPENSION WITH A LOADING PROJECTION AND MANUFACTURING METHOD THEREOF

BACKGROUND OF THE INVENTION

1. Field of the Invention

The present invention relates to floating magnetic head device installed in, for example, a hard disk drive, and, more particularly, to a magnetic head device and producing method thereof, in which a loading projection (pivot) can be easily and very precisely formed on a supporting member which supports a head body in order to allow the head body to assume a stable floating posture.

2. Description of the Related Art

FIG. 8 is a partial plan view of a conventional magnetic head device for use in a hard disk drive, whereas FIG. 9 is a partial side view thereof.

The magnetic head device comprises a head body 1 and a supporting member 2 which supports the head body 1.

The head body 1 includes a slider 3 opposing a disk D, such as a hard disk, with a thin film magnetic element 4 being provided at a trailing side Y end surface of the slider 3. The slider 3 is made of a ceramic material or the like. The thin film magnetic element 4 includes a MR head (or read head) and an inductive head (or a write head). The MR head detects any magnetic field leakage from a recording medium, such as a hard disk, by making use of the magneto-resistive effect, in order to read a magnetic signal. The inductive head includes, for example, a coil formed into a pattern.

The supporting member 2 comprises a load beam 5 and a flexure 6.

The load beam 5 is composed of a plate spring, and has bent portions 5a, formed into a rigid structure, on both sides of the load beam 5 so as to extend from the front portion to the middle portion thereof. The stem end of the load beam 5 is capable of providing a predetermined resilient pressing force. A spherical pivot 7 is formed near one end of a flat portion 5b formed between the bent portions 5a so as to project downward, in the figure. The head body 1 contacts the pivot 7 through a flexure 6 described below. A positioning hole 8 for alignment with the flexure 6 is formed in the flat portion 5b of the load beam 5.

The flexure 6, composed of a thin plate spring, comprises a fixing portion 6a, a cantilever 6b, and a connecting portion 6c. As shown in FIG. 8, a positioning hole 9 is formed in the fixing portion 6a. After alignment of the positioning hole 9 with the positioning hole 8 formed in the load beam 5, the fixing portion 6a is affixed to the bottom surface of the load beam 5 by, for example, spot welding. A slot is formed in one end of the flexure 6, and the portion separated by the slot forms the cantilever 6b and the connecting portion 6c. Stepped portions 6d are formed in the connecting portion 6c, so that the cantilever 6b is located below the fixing portion 6a.

The top surface of the cantilever 6b abuts against a pivot 7 of the load beam 5. The resiliency of the cantilever 6b allows the head body 1 bonded to the bottom surface of the cantilever 6b to change its posture freely on the bottommost point of the pivot 7 as a fulcrum.

The head body 1 of the magnetic head device is biased towards the disk D as a result of the resilient force provided at the stem end of the load beam 5. The magnetic head device is used in, for example, the so-called contact-start-stop (CSS) hard disk drive. When the disk D is stationary, the bottom surface of the head body 1, due to the aforementioned resilient force, contacts the recording surface of the disk D. When the disk D starts moving, air currents, flowing between the head body 1 and the disk D in the direction of movement of the disk D, produces a floating force exerted on the bottom surface of the head body 1, causing the head body 1 to float a short distance δ3 from the disk D.

As shown in FIG. 9, in the floating posture, the leading side X of the head body 1 is lifted higher from the disk D than the trailing side Y. While the head body 1 is assuming such a floating posture, either the MR head of the thin film magnetic element 4 detects a magnetic signal from the disk, or the inductive head writes the magnetic signal information.

The pivot 7 of the load beam 5 is formed by, for example, a pressing machine, such as that shown in FIG. 10, consisting of a punch 10 and a dice 11. The bottom portion of the punch 10 has a spherical face that curves outward. The portion of the top surface of the dice 11 opposing the punch 10 has a spherical hollow. The load beam 5 is placed on the dice 11, and the punch 10 is moved downward, in FIG. 10, to press a portion of the load beam 5 into the spherical hollow in the dice 11, thereby forming the spherical pivot 7 on the load beam 5.

Another method of forming a pivot 7 is illustrated in FIG. 11A. The punch of FIG. 11A has the same form as the punch 10 of FIG. 10, but the portion of the dice 11 of FIG. 11A opposing the punch 10 has a cylindrical hole 11a, instead of a hollow, so that the forms of the dices of FIGS. 10 and 11 are different. Similar to the method illustrated in FIG. 10, in the method illustrated in FIG. 11A, load beam 5 is placed on the dice 11 to press a portion of the load beam 5 downward by the punch 10, thereby forming a pivot 7 on the load beam 5.

However, when pressing machines, such as those shown in FIGS. 10A and 11A, are used, a bottommost point A of the bottom portion of the punch 10 and a bottommost point B of the spherical hollow in the dice 11 (or a line L drawn through the center of the hole 11a in FIG. 11A) may not be on (or lie along) a same vertical line M, causing the bottommost point A and the bottommost point B to be out of line by an amount equal to width T1 in FIG. 11, as well as the vertical line M passing through the bottommost point A and the centerline L to be separated by an amount equal to width T2 in FIG. 12. When pivot 7 is formed on the load beam 5 using a pressing machine, in which the bottommost point A and the bottommost point B are out of line, or the vertical line M passing through the bottommost point A and the centerline L are separated, a bottommost point C on the inner spherically shaped portion of the pivot 7 and the bottommost point B on the outer spherically shaped portion of the pivot 7 are out of line by the amount equal to width T1 in the pressing machine of FIG. 10 and by the amount equal to width T2 in the pressing machine of FIG. 11. This causes the pivots 7 to have ununiform film thicknesses, when they are formed using either one of the pressing machines of FIGS. 10 and 11.

Thus, it is necessary to make widths T1 and T2 as small as possible. In conventional pressing machines, however, tolerances of about 50 μm for the width T1, between the bottommost point A of the punch 10 and the bottommost point B of the dice 11, and width T2, between the vertical line M passing through the bottommost point A and the centerline L of the hole 11a in FIG. 11A, cannot be avoided.

In the pressing machine of FIG. 10, there may also be tolerances due to variations in die processing precision, so
} that the bottommost point B of the dice 11 is positioned about 5 to 10 μm away from where the dice 11 should actually be positioned. Therefore, in the pressing machine of FIG. 10, the maximum width T1 between the outer bottommost point B and the inner bottommost point C of the pivot 7 as a result of the tolerance becomes as large as about 60 μm.

Crystal grains, such as those shown in FIG. 11B, protrude from the outer side of the pivot 7 formed by the pressing machine of FIG. 11A, causing hills and valleys to be formed near the bottommost point B of the pivot 7. These protruding crystal grains cause the outer bottommost point B of the pivot 7 to be out of line by a even greater amount in correspondence with width T3 (equal to about 10 to 30 μm), so that the maximum width T2 between the outer bottommost point B of the pivot 7 and the inner bottommost point C of the pivot 7 becomes as large as 80 μm.

When the outer bottommost point B and the inner bottommost point C of the pivot 7 are not in line, the following problems arise.

When the head body 1 is floating, the fulcrum on which the head body 1 rocks freely is located at the outer bottommost point B of the pivot 7. Therefore, when the head body 1 is being affixed to the bottom surface of the cantilever 6b of the flexure 6 during assemblage of the magnetic head device, the head body 1 must be positioned so that the bottommost point B of the pivot 7 contacts a predetermined location (about the center) of the upper surface of the head body 1.

However, when the head body 1 is being positioned, the outer edge of the head body 1 is positioned with reference to the bottommost point C of the recess in the pivot 7, ordinarily by using a video camera or the like from the upper surface side of the load beam 5 (see FIG. 8). Then, the head body 1 is bonded to the bottom surface of the cantilever 6b. In other words, while one looks down on the load beam 5 from directly above it, on the assumption that the outer bottommost point B of the pivot 7 is located on the vertical line on which the inner bottommost point C of the pivot 7 is located, the inner bottommost point C of the pivot 7 and the predetermined location of the head body 1 are brought in line using a jig (see FIG. 8).

Thus, as shown in FIG. 12, when the outer bottommost point B of the pivot 7 and the inner bottommost point C of the pivot 7 do not lie on the same vertical line M, so that the bottommost point C of the pivot 7 and the predetermined location of the head body 1 are not in line, a predetermined location E of the top surface of the head body 1 which should contact the outer bottommost point B of the pivot 7 is not in line with the outer bottommost point B of the pivot 7. Therefore, the floating posture of the head body 1, particularly in the rolling direction, becomes unstable.

The larger the separation between the predetermined location E of the top surface of the head body 1 and the outer bottommost point B of the pivot 7, the larger the variation, δ4, in the floating amount of the head body 12 in the rolling direction, as illustrated in FIG. 12. The variation δ4 in the floating amount of the head body 1 supported by the pivot 7 formed by the pressing machine of FIG. 10 becomes as large as about 20 nm, whereas the variation δ4 in the floating amount of the head body 1 supported by the pivot 7 formed by the pressing machine of FIG. 11A becomes as large as about 25 nm. Even if there is a desire to make the head body 1 smaller, and the spacing 63 (shown in FIG. 9) is made smaller, a large variation δ4 in the floating amount causes the spacing δ3 to be essentially large, thereby preventing high-density recording.

A thin film electrode terminal portion (connecting portion), led out from the thin film magnetic element 4, is formed at the trailing side (Y) end surface of the head body 1. Conventionally, a thin wire was electrically connected to the electrode terminal portion, and extended to the stem end of the load beam, in order to wire the head body 1. Recently, however, another wiring structure was proposed. In the proposed structure, instead of using the aforementioned wire, a thin film signal conducting pattern is formed at the bottom surface of the flexure 6 in order to electrically connect a connecting portion of the signal conducting pattern and the electrode terminal portion of the head body 1.

This wiring structure, however, gives rise to another problem not mentioned above.

In other words, when the head body 1 is aligned with reference to the inner bottommost point C of the hollow in the pivot 7 of the load beam 5, at the moment the head body 1 is bonded to the bottom surface of the cantilever 6b of the flexure 6, there is a large tolerance occurring between the positions of the electrode terminal portion, formed at the trailing side Y end surface of the head body 1, and the connecting portion of the signal conducting pattern, so that the electrode terminal portion and the pattern connecting portion are out of line by a large amount, thereby preventing reliable positioning and bonding of both of these portions.

When the head body 1 is bonded to the bottom surface of the cantilever 6b of the flexure 6, with reference to the electrode terminal portion of the head body 1 and the signal conducting pattern connecting portion, no problems arise with regard to electrical contact between the head body 1 and the signal conducting pattern, but the bottommost point B of the pivot 7 of the load beam 5 and the predetermined location of the head body 1 are out of line by a greater amount.

The pivot 7 may be formed on the cantilever of the flexure 6. In this case, the tolerance produced in assembling the load beam 5 and the flexure does not add to any variations in the floating amount, so that when the head body 1 is positioned with reference to the connecting portion of the signal conducting pattern formed in the flexure 6, it is preferable that the pivot 7 be formed on the cantilever 6b.

However, as mentioned above, when the pivot 7 shown in FIG. 10 or FIG. 11A is formed by pressing, not only are the bottommost point B of the pivot 7 and the predetermined location of the head body 1 brought out of line by a large amount, but problems such as formation of a hole in the pivot 7 or distortion of the cantilever 6b may occur, since the film of the flexure 6 is very thin compared to the load beam 5.

SUMMARY OF THE INVENTION

Accordingly, it is an object of the present invention to provide a magnetic head device and a production method thereof, in which a loading protrusion, serving as a fulcrum upon which the head body rocks, can be formed with high precision, and the topmost or bottommost point of the loading protrusion and a predetermined location of the head body can be set very precisely at the proper location relative to each other.

It is another object of the present invention to provide a magnetic head device and a production method thereof, in which when a signal conducting pattern formed on a flexure and an electrode terminal portion of a head body are to be bonded together, the signal conducting pattern and the electrode terminal portion, as well as the loading protrusion and a predetermined location of the head body are not brought out of line by a large amount in relation to each other.

To these ends, according to a first aspect of the present invention, there is provided a magnetic head device comprising a load beam having a flat-shaped loading projection formed integrally therewith by bending a portion of the load beam; a flexure formed at the load beam, the flexure having a resiliently displaceable cantilever; and a head body affixed to the cantilever; wherein a bottommost point of the loading projection contacts the cantilever, and serves as a fulcrum upon which the head body is displaced.

According to a second aspect of the present invention, there is provided a magnetic head device comprising a load beam; a flexure formed at the load beam, the flexure having a resiliently displaceable cantilever having a plate-shaped loading projection formed integrally therewith by bending a portion of the flexure; and a head body affixed to the cantilever; wherein a topmost point of the loading projection contacts the load beam, and serves as a fulcrum upon which the head body is displaced.

Although not exclusive, the flexure may have formed thereon a signal conducting pattern with a connecting portion, and the head body may have an electrode terminal portion, with the connecting portion of the signal conducting pattern and the electrode terminal portion being bonded together with an adhesive.

According to a third aspect of the present invention, there is provided a method of producing a magnetic head device comprising a load beam, a flexure formed at the load beam and having a resiliently displaceable cantilever, and a head body affixed to the cantilever, the method comprising the step of either bending a portion of the load beam towards the cantilever to form a loading projection as a fulcrum upon which the head body is displaced in order to contact a bottommost point of the loading projection with the cantilever; or bending a portion of the cantilever towards the load beam in order to contact a topmost point of the loading projection with the load beam.

Although not exclusive, the loading projection is formed by separating a portion of either of the load beam or the cantilever by etching, and bending the etched portion from the load beam or the cantilever.

A description will now be given of the method of forming the aforementioned loading projection, as well as the method of positioning the head body.

For example, as shown in FIG. 4, a slot 13 is formed near the tip of a flat load beam 5, and separates a portion which becomes a pivot 12. Bending the separated portion downward along dotted lines n causes the pivot 12 to project obliquely downward. As in FIG. 2, when one looks downward on the magnetic head device from directly above it, the bottommost point B of the pivot 12 can be seen in the slot 12 having the same shape as the pivot 12.

Conventionally, the bottommost point B of the pivot 7 could not be seen from directly above it, since it was formed into a spherical shape by, for example, a pressing machine. Therefore, it was impossible to see the bottommost point B of the pivot 7 while the bottommost point B of the pivot 7 was being brought in line with a predetermined location of the head body 1. In the present invention, however, as mentioned above, the bottommost point B of the pivot 7 can be seen from directly above it, so that the bottommost point B and the he ad body 1 can be directly and easily brought in line, thereby reducing the amount by which the bottommost point of the pivot and the head body are out of line.

By reducing the amount by which the bottommost point of the pivot and the predetermined location of the head body are out of line, variations in the floating amount of the head body, particularly in the rolling direction, are reduced, thereby reducing the spacing between the head body and the disk, as a result of which high-density recording is realized.

In the present invention, it is preferable that the slot 13 of FIG. 4 be formed by etching. This allows the pivot 12 separated by the slot 13 to be formed more precisely to the desired shape and at the proper position.

In addition, in the present invention, when the head body is positioned with reference to the connecting portion of the thin film electrode pattern formed on the bottom surface of the flexure, it is particularly preferable that the loading projection be formed on the cantilever of the flexure.

When the loading projection is formed on the cantilever of the flexure, the amount by which the load beam and the flexure are out of line does not add to any variations in the floating amount.

When the connection portion of the signal conducting pattern and the bottommost point of the loading projection are formed more precisely at the proper locations in relation to each other, the amount by which the predetermined location of the head body and the bottommost point of the loading projection are out of line can be minimized, allowing the floating posture of the head body to be stabilized.

According to the present invention, in order to form the connecting portion of the signal conducting pattern and a point of the loading projection more precisely at the proper locations in relation to each other, the loading projection is formed on the cantilever of the flexure by separating a portion of the flexure by a slot just as in the case where a loading projection is formed on the load beam by separating a portion of the load beam by a slot. (See FIG. 6.)

Forming the loading projection by separating a portion of the cantilever by a slot overcomes conventional problems, such as formation of a hole in the loading projection.

It is preferable that the slot be formed by etching, since in such a case the loading projection can be formed more precisely to the desired shape and at the proper location.

When the amount by which the bottommost point of the pivot and a predetermined location of the head body are out of line is reduced, variations in the floating amount of the head body, particularly in the rolling direction, becomes small, thereby reducing the spacing between the head body and the disk, as a result of which high-density recording can be achieved.

DESCRIPTION OF THE PREFERRED EMBODIMENTS

Figure 1:
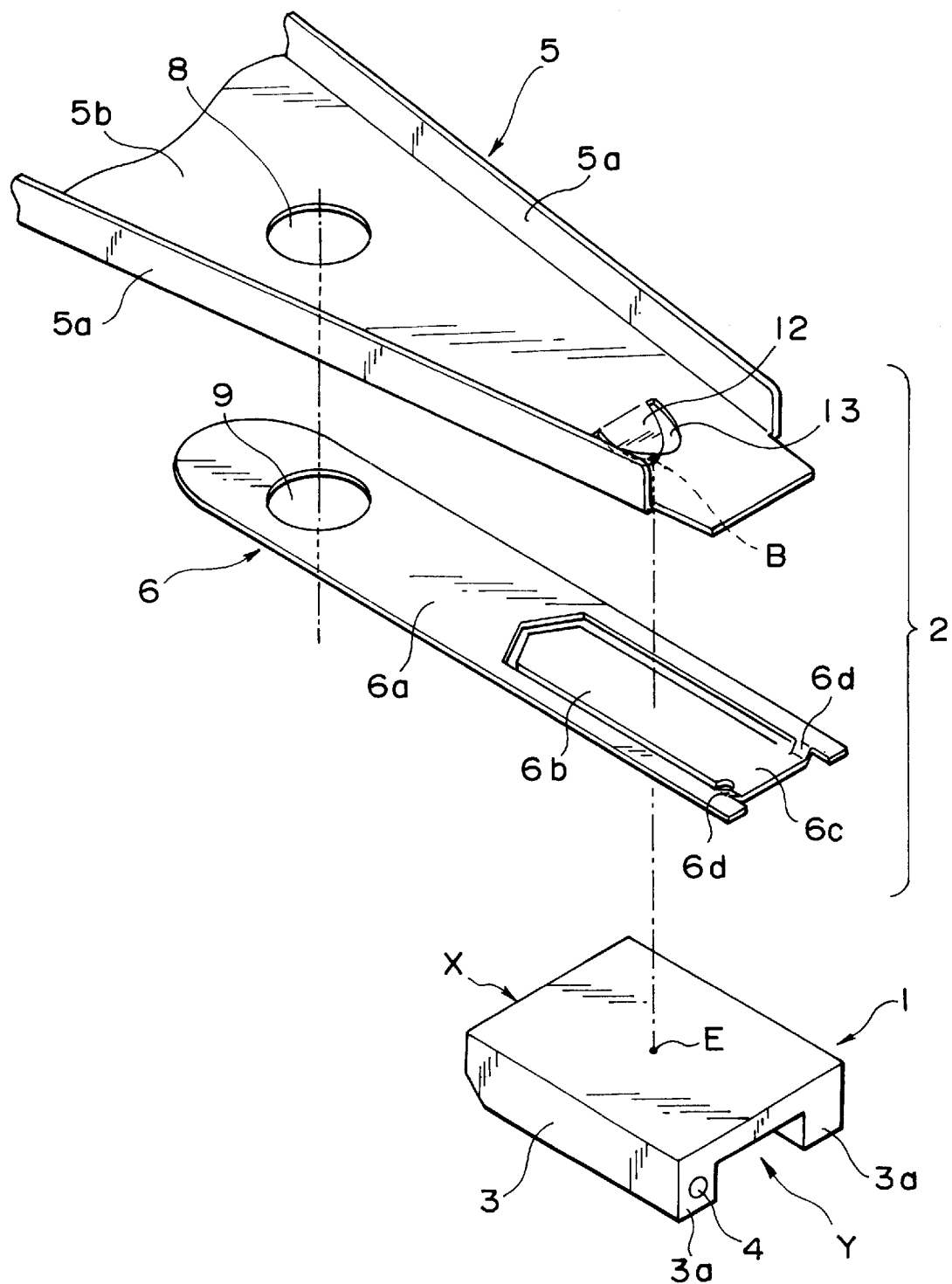
FIG. 1 is a partial exploded perspective view of a first embodiment of the magnetic head device provided in a hard disk drive, in accordance with the present invention.
Figure 2:
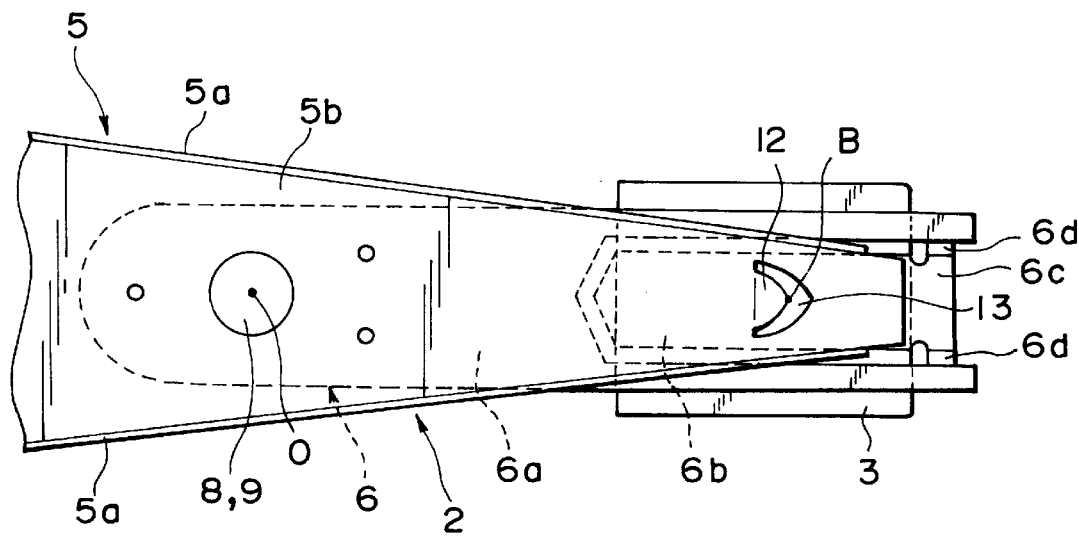
FIG. 2 is a partial plan view of the magnetic head device of FIG. 1 in an assembled state.
Figure 3:
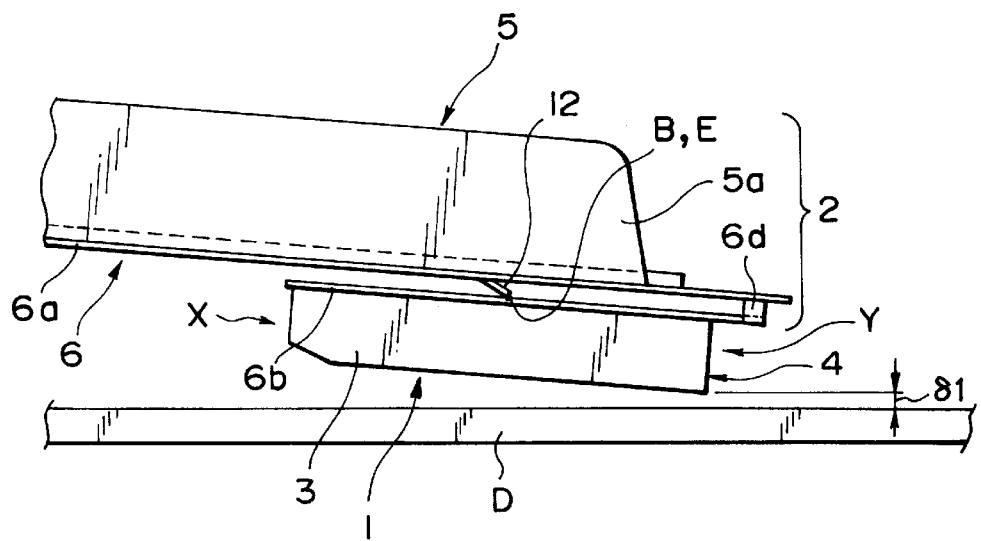
FIG. 3 is a partial side view of the magnetic head device of FIG. 2.
Figure 4A:
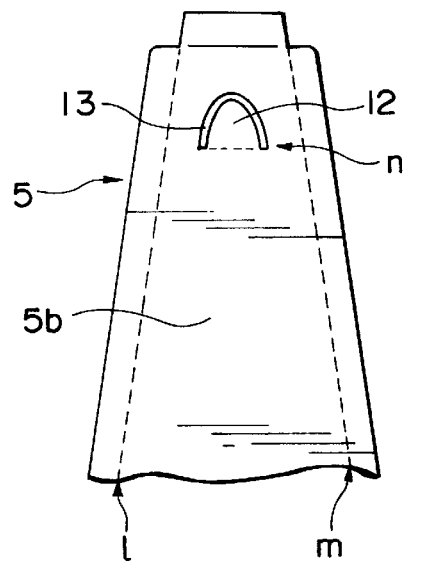
FIG. 4A is a partial view of the load beam of FIG. 1 with a pivot (loading projection).
Figure 4B:
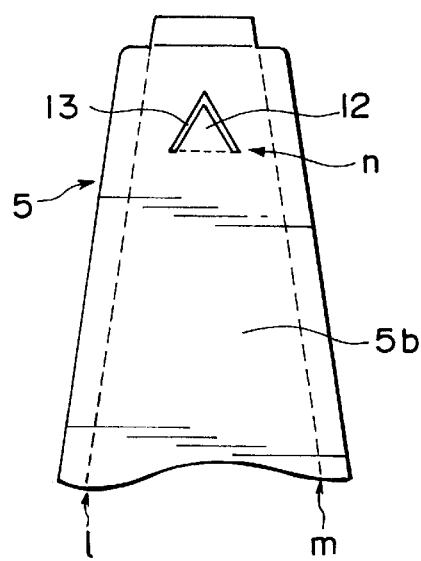
FIG. 4B is a partial view of the load beam of FIG. 1 with a differently shaped pivot (loading projection).

FIG. 1 is a partial exploded perspective view of a first embodiment of the floating magnetic head device provided in, for example, a hard disk drive, in accordance with the present invention. FIG. 2 is a partial plan view of the magnetic head device in an assembled state. FIG. 3 is a partial side view of the magnetic head device in an assembled state. FIG. 4A is a partial view showing the load beam of FIG. 1 with a pivot. FIG. 4B is a partial view showing the load beam of FIG. 1 with a differently shaped pivot.

The magnetic head device comprises a head body 1 and a supporting member 2 which supports the head body 1.

The head body 1 comprises a slider 3 and a thin film magnetic element 4 provided at the trailing side Y end of the slider 3. The slider 3 is made of a ceramic material, and, as shown in FIG. 1, has rails 3a (floating surfaces; ABS surfaces) opposing a disk D.

The aforementioned thin film magnetic element 4 is a layered structure of a magnetic material, such as Permalloy (Ni—Fe type alloy), or an insulating material, such as alumina. The thin film magnetic element 4 includes a magnetic detecting section for reproducing a magnetic recording signal recorded on a disk, and/or a magnetic recording section for recording a magnetic signal on a disk. The magnetic detecting section is, for example, a magneto-resistance (MR) head composed of a magneto-resistance (MR) element. The magnetic recording section is an inductive head with a coil and a core, formed into a pattern.

The supporting member 2 comprises a load beam 5 and a flexure 6. The load beam 5 is composed of a plate spring. The load beam 5 has bent portions 5a formed into a rigid structure on both sides thereof so as to extend from the upper left side of the FIG. 5 to around one end of the load beam 5. The bent portions 5a extend to about the middle portion of the load beam 5. The load beam 5 also has a plate spring functioning portion (not shown) extending from the rear ends of the bent portions 5a to the stem end portion of the load beam 5. The load beam 5 has a flat portion 5b formed between the bent portions 5a in such a way as to become smaller and smaller in width towards the front portion of the load beam 5, as shown in FIG. 1.

A slot 13 is formed in a portion near one end of the flat portion 5b of the load beam 5. When the slot 13 is formed, a flat pivot (loading protrusion) 12, having a shape similar to that of the slot 13 and formed integrally with the load beam 5, is formed so as to protrude obliquely downward from the slot 13.

As shown in FIG. 1, the pivot 12 has a circular shape with a predetermined curvature at a bottommost point B thereof.

The bottommost point B is such as to contact a predetermined location E, located at about the center portion of the upper surface of the head body 1, through a cantilever 6b of the flexure 6 (described later).

Although the shape of the pivot 12 in the present invention is not limited to any particular shape, it is preferable that the bottommost portion of the pivot 12 be formed into either a circular shape (as shown in FIG. 1) or a V shape (as shown in FIG. 4B), in order to make the area of contact between the pivot 12 and the cantilever 6b as small as possible. By virtue of such a structure, the head body 1 can be rockably supported by the bottommost point B of the pivot 12 as a fulcrum. In other words, the head body 1 can rock freely, since the bottommost portion of the pivot 12 formed to resemble as much as possible to a point.

In particular, according to the present invention, as mentioned above, the pivot 12 is formed into a flat shape, allowing the form of contact between the pivot 12 and the head body 1 through the cantilever 6b to be as close as possible to a point contact.

A description will now be given of the method of forming the above-described pivot 12, with reference to FIGS. 4A and 4B.

FIGS. 4A and 4B are views each showing only the portion around one end of the load beam 5.

A slot 13 is formed in a portion near one end of the flat portion 5b of the load beam 5. The slot 13 separates a portion from the other portion of the load beam 5, forming the pivot 12. The load beams of FIGS. 4A and 4B are each bent upwardly along dotted lines l and m, forming bent portions 5a. In addition, the load beams are each bent downwardly along dotted lines n, which mark the boundary between the pivot 12 and the flat portion 5b, thereby causing each of the pivots 12 to protrude downwardly from the flat portion 5b of the load beam 5, as shown in FIGS. 1 and 3.

In the present invention, it is preferable that each of the slots 13 be formed by etching. The overall structures of each of the load beams 5 of FIGS. 4A and 4B are formed by etching a flat plate. Therefore, when the slots 13 are formed by etching, the etching can be performed in the same etching step performed to form the overall structures of their corresponding load beams 5, thereby reducing the number of steps and hence production costs.

Compared to a pivot formed by pressing or the like, the pivots 12, formed by etching, are formed more precisely to a desired shape and at a proper location. Therefore, the floating posture of the head body 1 can be made more stable.

As shown in FIGS. 1 and 2, a positioning hole 8, with a predetermined inner diameter, is formed in the flat portion 5b of the load beam 5 rearwardly of the pivot 12.

The flexure 6 is formed of a thin spring plate. The flexure 6 has a fixing portion 6a with a positioning hole having the same inner diameter as the positioning hole 8 of the load beam 5. As shown in FIG. 1, a slot is formed near one end of the flexure 6, forming the cantilever 6b and a connecting portion 6c that are separated by the slot from the other portion of the flexure 6. The connecting portion 6c has stepped portions 6d, so that the cantilever 6b is located below the fixing portion 6a.

As can be understood from the foregoing description, according to the present invention, a slot 13 is formed in the load beam 5. The slot 13 separates a portion from the other portion of the load beam 5. This separated portion is bent, forming the pivot 12. Therefore, when, as shown in FIG. 2, the magnetic head device is viewed from directly above it, the bottommost point B of the pivot 12 can be seen through to the slot 13.

In other words, according to the present invention, the bottommost point B of the pivot 12, serving as fulcrum on which the head body 1 can freely rock, can be brought in line with the predetermined location of the head body 1 by directly looking at the pivot in the slot 13. Therefore, the amount by which the bottommost point B of the pivot 12 and the predetermined location of the head body 1 are out of line can be minimized.

Figure 5:
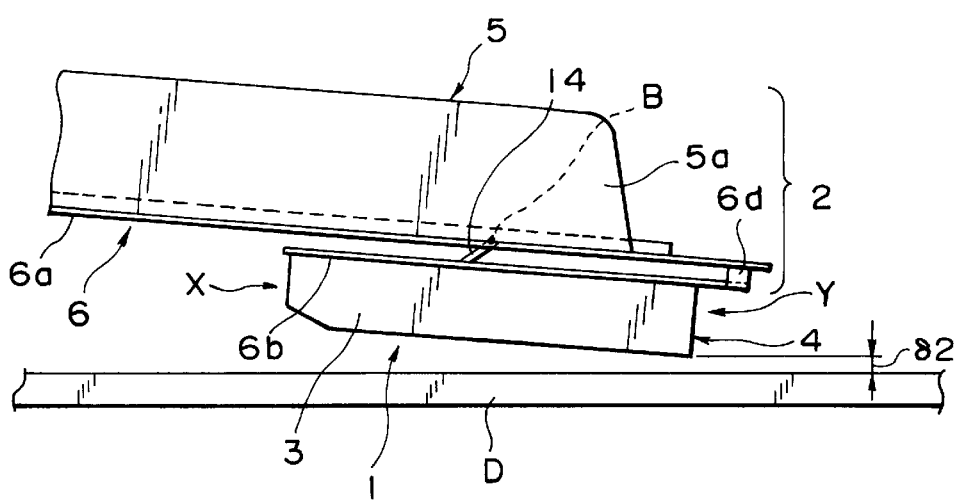
FIG. 5 is a partial side view of a second embodiment of the magnetic head device provided in a hard disk drive, in accordance with the present invention.
Figure 6:
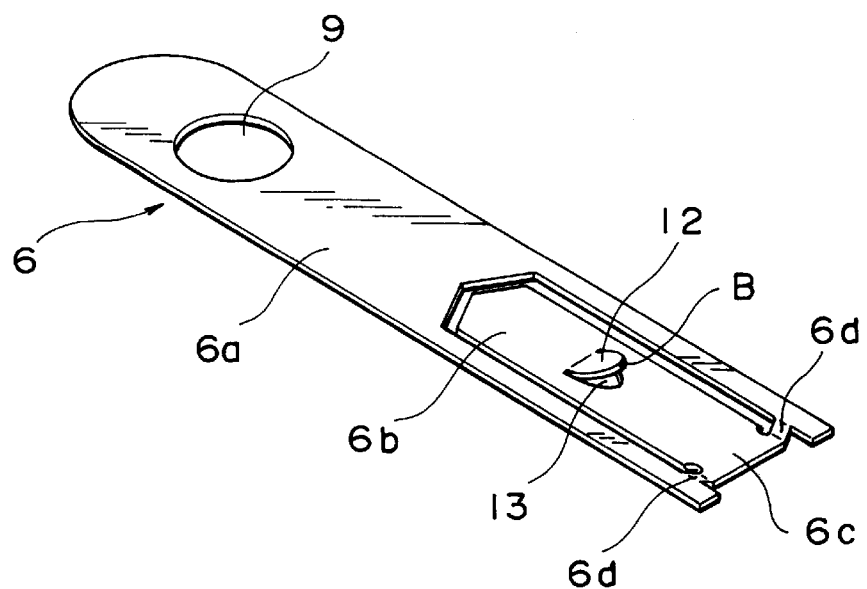
FIG. 6 is a perspective view of the flexure of FIG. 5.
Figure 7:
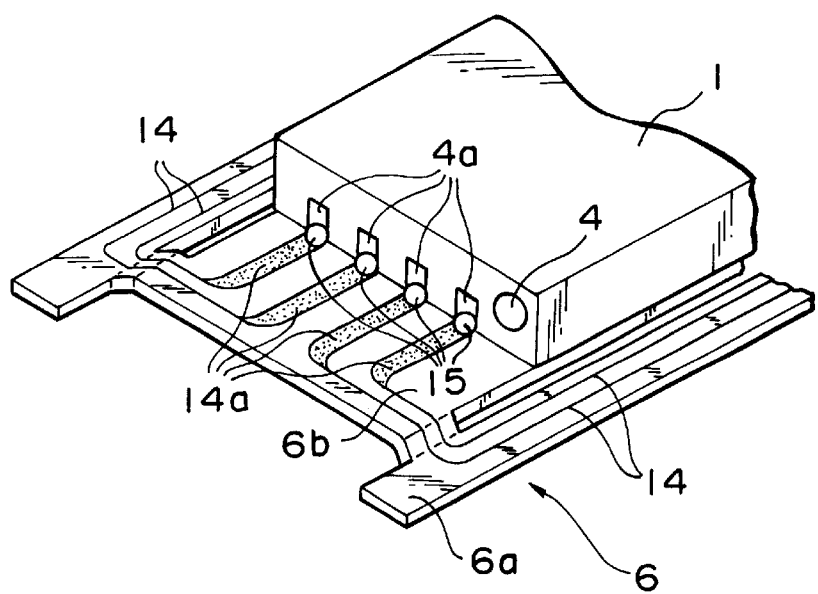
FIG. 7 is a partial enlarged bottom view showing the structure of the bottom surface of the flexure of the magnetic head device of FIG. 5.
Figure 8:
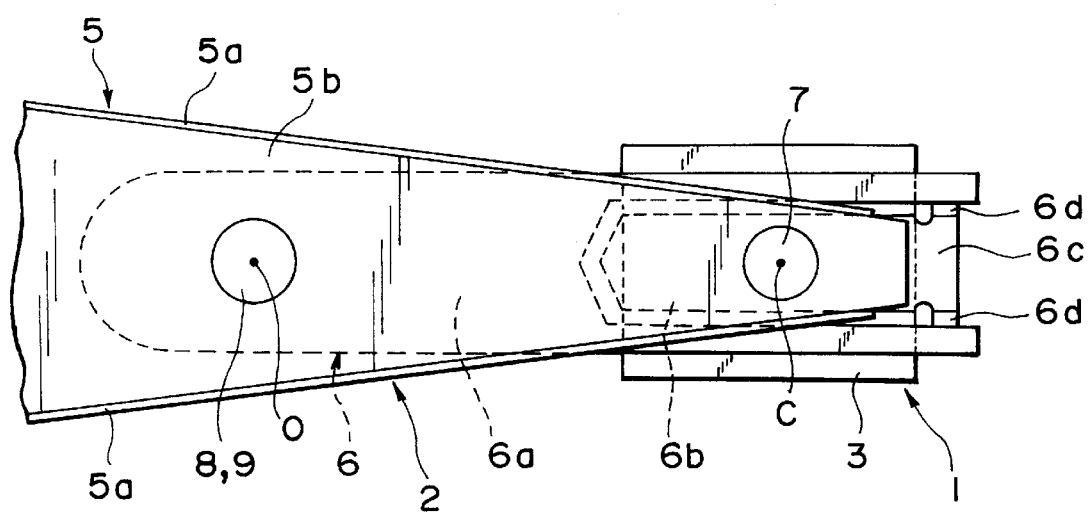
FIG. 8 is a partial plan view of a conventional magnetic head device.
Figure 9:
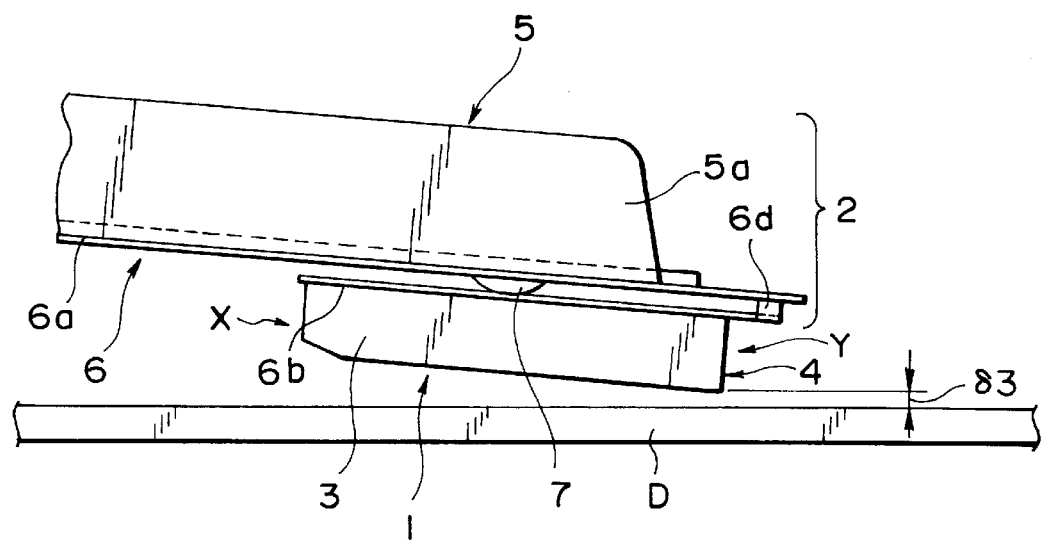
FIG. 9 is a partial side view of the conventional magnetic head device of FIG. 8.
Figure 10:
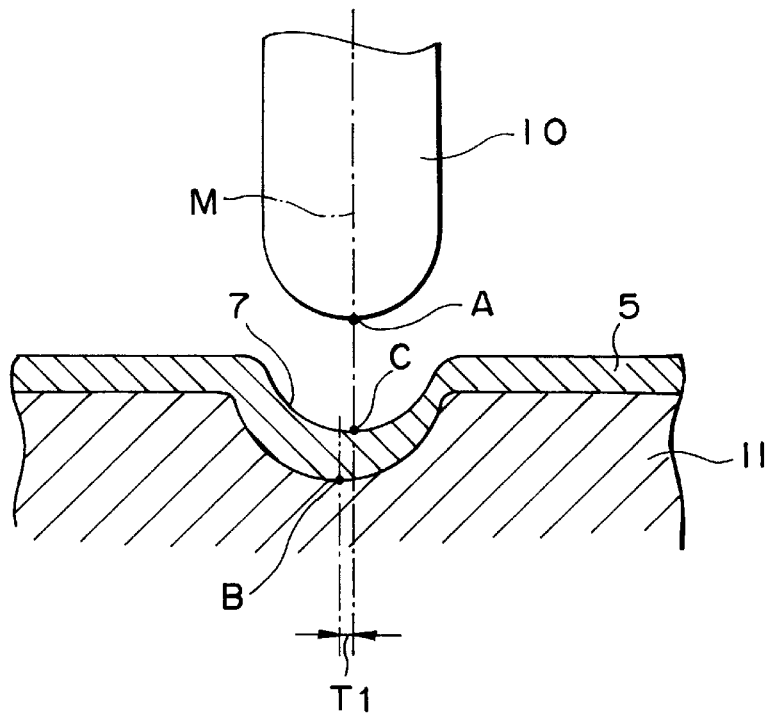
FIG. 10 is a sectional view showing the form of a first pressing machine for forming a pivot on the flexure.
Figure 11A:
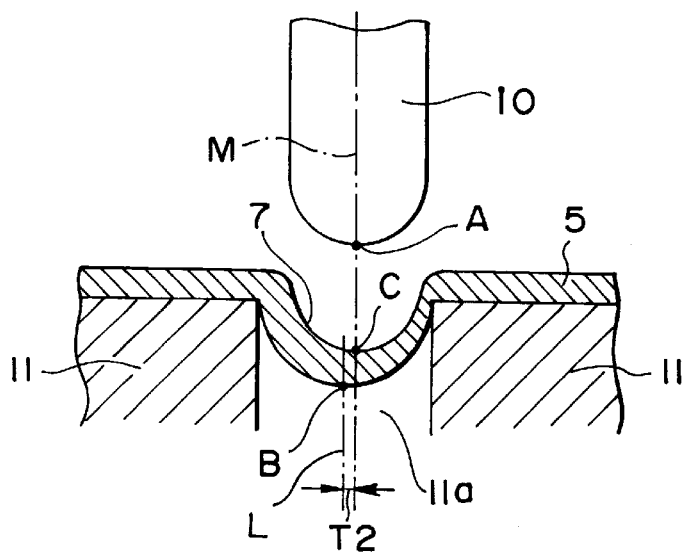
FIG. 11A is a sectional view showing the form of a second pressing machine for forming a pivot on the flexure.
Figure 11B:
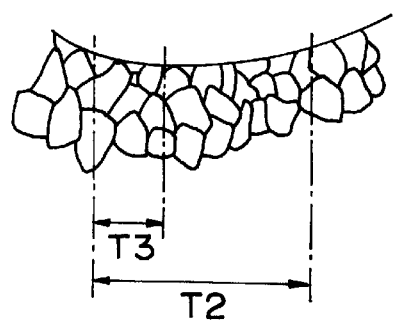
FIG. 11B is a view showing how the lower surface of the pivot (loading projection) formed by the second pressing machine appears.
Figure 12:
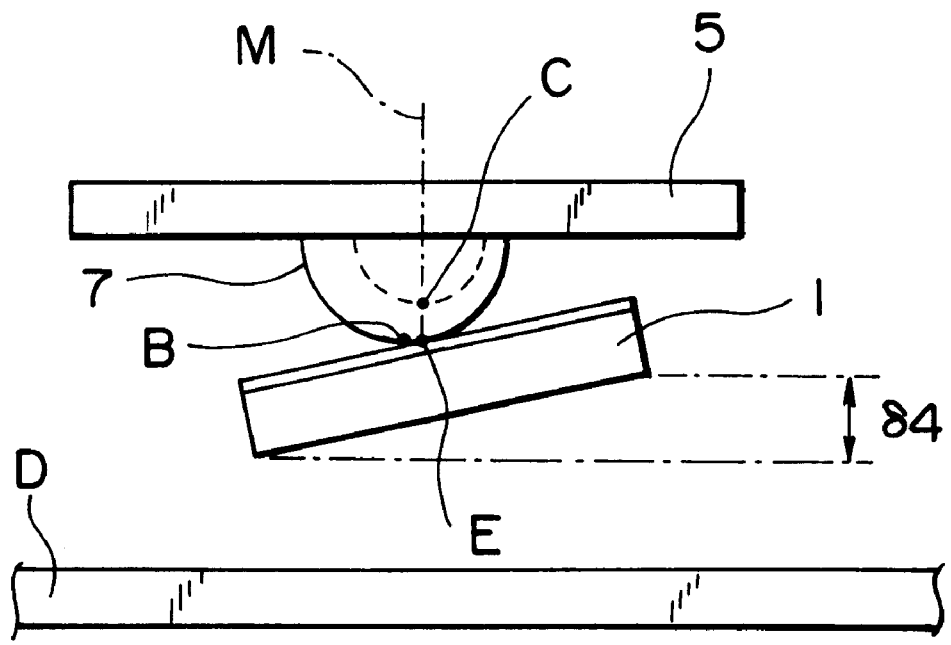
FIG. 12 is a partial front view of the conventional head device.

FIG. 5 is a partial side view of a second embodiment of the floating magnetic head device provided in a hard disk drive in accordance with the present invention. FIG. 6 is a perspective view of the flexure. FIG. 7 is a partial enlarged bottom view of the magnetic head device of FIG. 5, as viewed from the back side.

As shown in FIG. 6, a slot 13 is formed in a cantilever 6b of a flexure 6. A pivot (loading protrusion) 12, having a similar shape to that of the slot and being integrally formed with the cantilever 6b, protrudes obliquely upward from an edge of the slot 13. The pivot 12 is formed in exactly the same manner as the pivots 12 shown in FIGS. 4A and 4B. In other words, the slot is formed, for example, by etching the cantilever 6b of the flexure 6. The slot separates a portion from the other portion of the cantilever 6b. This separated portion forms the pivot 12, which is bent obliquely upward, thereby completing the formation of the flexure 6, as shown in FIG. 6.

As shown in FIG. 7, a signal conducting pattern 14, formed of a thin film, is formed at the back side of the flexure 6. The signal conducting pattern 14 is a three layered structure consisting of, for example, a foundation layer formed on the flexure 6, a circuit pattern formed on the foundation layer, and a protective layer formed on the circuit pattern. The foundation layer is made of polyimide resin. The circuit pattern, made of gold (Au), copper (Cu), or the like, is formed, for example, by evaporation, sputtering, or etching. The protective layer is made of polyimide resin.

As shown in FIG. 7, at an area at one end of the flexure 6, the signal conducting pattern 14 is formed so as to extend from the fixing portion 6a to the cantilever 6b of the flexure 6. The width of the signal conducting pattern 14 formed on the cantilever 6b becomes larger and larger towards the stem portion of the flexure 6. The signal conducting pattern has connecting portions 14a for connection with the head body 1.

Thin film electrode terminal portions 4a, led from the thin film magnetic element 4, are formed at the trailing side end portion of the head body 1 so as to be spaced at the same interval as the connecting portions 14a of the signal conducting pattern 14.

In the magnetic head device, the head body 1 is positioned with reference to the connecting portions 14a of the signal conducting pattern 14. In other words, since the pivot 12 and the connecting portions 14a are formed on the same flexure 6, the topmost point of the pivot 12, serving as a fulcrum on which the head body 1 can rock, and the connecting portions 14a can be positioned very precisely relative to each other. In particular, when the pivot 12 is formed during the etching step, the connecting portions 14a, formed in a film deposition step, can be positioned very precisely relative to each other, since errors occur only in the production of, for example, the mask. In addition, when the pivot is formed on the load beam, the tolerance produced in assembling the load beam and the flexure does not add to the tolerance between the relative positions of the topmost point of the pivot 12 and the connecting portions 14a.

Therefore, when the head body 1 is positioned with reference to the connecting portions 14a, such that the connecting portions 14a and the electrode terminal portions 4a of the head body 1 do not get misaligned, in order to affix the head body 1 and the cantilever 6b together, the head body 1 and the topmost point of the pivot 12 are positioned relative to each other with high precision.

In bonding the head body 1 below the cantilever 6b of the flexure 6, the electrode terminal portions 4a, formed at the trailing side end surface of the head body 1, and the connecting portions 14a of the signal conducting pattern 14 are aligned relative to each other, followed by bonding of the head body 1 to the cantilever 6b. Then, adhesives 14 are applied when, for example, gold (Au) ball bonding is performed at the bonding portions between the electrode terminal portions 4a of the head body 1 and the connecting portions 14a of the signal conducting pattern 14.

As shown in FIG. 5, the head body 1 of the magnetic head device constructed in the above-described manner is rockably supported on the topmost point B of the pivot 12, serving as a fulcrum, through the cantilever 6b. In this case, the predetermined location of the head body 1 and the topmost point of the pivot 12 are out of line by only a small amount, so that when the head body 1 is floating, it can assume a stable posture in the rolling direction.

According to the present invention, the pivot 12 is formed into a flat shape, so that the form of contact between the topmost point B of the pivot 12 and the bottom surface of the load beam 5 can be made very close to a point contact, so that the head body 1 can rock freely on the topmost point B of the pivot 12, as fulcrum, by following the hills and valleys of recording media, thereby improving reproducing and writing characteristics.

In addition, according to the present invention, the pivot 12, which was conventionally formed by pressing, is not formed by pressing, thereby, for example, preventing the formation of a hole in the pivot 12 or distortion of the cantilever 6b.

The magnetic head devices of each of the embodiments described above are used in a CSS hard disk drive (magnetic recording/reproducing apparatus). When the disk is stationary, the head body 1 is resiliently pressed against the top surface of the disk D due to the resilient force produced by the plate spring functioning portion at the stem end of the load beam 5, so that the rails 3a of the slider 3 of the head body 1 contact the disk D. As shown in FIGS. 3 and 5, when the disk D starts rotating, air currents, flowing between the head body 1 and the disk D, cause the entire head body 1 to float above the disk D by a distance $\delta 1$ or a distance $\delta 2$, so that the head body 1 assumes either a floating posture in which the leading side X is lifted higher than the trailing side Y from the disk, or a floating posture in which only the leading side X floats above the disk and the trailing side Y continuously or discontinuously contacts with and slides along the disk.

In the magnetic head devices of each of the embodiments described above, the topmost or bottommost point B of the pivot 12 and a predetermined location of the head body 1 are out of line by only about 10 to 15 $\mu$m virtually in correspondence with how precisely etching can be carried out to form the entire structures of each of the component parts, and the pivot can be formed precisely at the proper location.

By reducing the amount by which the topmost or bottommost point B of the pivot 12 and a predetermined location of the head body 1 are out of line, when the pivot 12 is formed on the load beam 5, variation in the floating amount of the head body 1 in the rolling direction is reduced to about 5 to 7 nm, and when the pivot 12 is formed on the cantilever 6b of the flexure 6, variation in the floating amount of the head body 1 in the rolling direction is reduced to about 3 to 5 nm. Therefore, as shown in FIGS. 3 and 5, the spacing δ1 and the spacing δ2 can be made small, so that high-density recording can be realized.

As can be understood from the foregoing description, according to the present invention, a slot is formed in the load beam, and the portion separated by the slot is bent to form a loading protrusion (pivot).

When the loading protrusion is formed into a flat shape, and a pivot having a shape similar to that of the slot is formed in either the load beam or the cantilever, the topmost point or the bottommost point of the pivot can be seen in the slot.

This means that the topmost point or the bottommost point of the loading protrusion and a predetermined location of the head body can be brought in line by looking at the loading protrusion in the slot formed in the load beam, thereby allowing the head body to be positioned more precisely, and changes in the floating amount of the head body, particularly in the rolling direction can be made small, so that the spacing between the head body 1 and the disk can be made small, as a result of which high-density recording can be realized.

When a signal conducting pattern is formed on the bottom surface of the flexure, and the head body is positioned with reference to the connecting portions of the signal conducting pattern, it is preferable to form the loading projection on the cantilever of the flexure, since the amount by which the load beam and the flexure are out of line does not add to the amount by which the head body and the loading projection are out of line.

According to the present invention, just as a loading projection can be formed in the load beam by forming a slot in the load beam, a loading projection can also be formed in the cantilever of the flexure by forming a slot in the flexure. Accordingly, the loading projection and the connecting portions of the signal conducting pattern can be positioned more precisely, so that changes in the amount of floating of the head body, particularly in the rolling direction, are reduced, thereby reducing the spacing between the head body and the disk to allow high-density recording to be achieved.

In particular, according to the present invention, the loading projection can be formed by etching, which facilitates formation of the loading projection. In addition, compared to the case where the loading projection is formed by a pressing operation, the loading projection can be formed more precisely into the desired shape and at the proper location, so that the head body can assume a more stable floating posture.

What is claimed is:

1. A magnetic head device, comprising:

a load beam;

a flexure attached separately to said load beam, said flexure having a resiliently displaceable cantilever having a flat loading projection formed integrally therewith by forming a slot and by bending a portion of said flexure; and a head body affixed to said cantilever;

wherein said loading projection comprises a perimeter portion having a curved shape or a V shape;

wherein a topmost point of said loading projection contacts said load beam, and serves as a fulcrum upon which said head body is displaced.

2. A magnetic head device according to claim 1, wherein said flexure has formed thereon a signal conducting pattern with a connecting portion, and wherein said head body has an electrode terminal portion, said connecting portion of said signal conducting pattern and said electrode terminal portion being bonded together with an adhesive.

3. A method of producing a magnetic device comprising a load beam, a flexure attached separately to said load beam and having a resiliently displaceable cantilever, and a head body affixed to said cantilever, said method comprising the steps of:

forming a curved shaped or a V shaped slot in part of said load beam, and bending a portion of the load beam surrounded by the slot towards the cantilever to form a loading projection as a fulcrum upon which the head body is displaced in order to contact a bottommost point of the loading projection with the cantilever;

wherein the shape of said loading projection is defined by the shape of the slot.

4. A method of producing a magnetic head according to claim 3, wherein the loading projection is formed by forming the slot in Dart of the load beam by etching, and bending the portion of the load beam surrounded by the slot towards the cantilever from the load beam.

5. A method of producing a magnetic head device comprising a load beam, a flexure attached separately to said load beam and having a resiliently displaceable cantilever, and a head body affixed to said cantilever, said method comprising the steps of;

forming a curved shaped or a V shaped slot in part of said cantilever, and bending a portion of the cantilever surrounded by the slot towards the load beam to form a loading projection as a fulcrum upon which the head body is displaced in order to contact a topmost point of the loading projection with the load beam;

wherein the shape of said loading projection is defined by the shape of the slot.

6. A method of producing a magnetic head according to claim 5, wherein the loading projection is formed by forming the slot in part of said cantilever by etching, and bending the portion of the cantilever surrounded by the slot towards the load beam from the cantilever.

* * * * *

UNITED STATES PATENT AND TRADEMARK OFFICE
CERTIFICATE OF CORRECTION

PATENT NO. : 6,144,531
DATED : November 7, 2000
INVENTOR(S) : Kanji Sawai

It is certified that error appears in the above-identified patent and that said Letters Patent is hereby corrected as shown below:

Title page,
Column 1,
Item [22], change "Jun. 4, 1998" to -- Jun. 3, 1998 --.

Claim 4,
Line 3, change "Dart" to -- part --.

Signed and Sealed this

Eleventh Day of December, 2001

Attest:

NICHOLAS P. GODICI
Attesting Officer    Acting Director of the United States Patent and Trademark Office